US007484656B2

(12) United States Patent
McLean et al.

(10) Patent No.: US 7,484,656 B2
(45) Date of Patent: Feb. 3, 2009

(54) APPARATUS, SYSTEM, AND METHOD FOR CORRELATING A COST OF MEDIA SERVICE TO ADVERTISING EXPOSURE

(75) Inventors: James Gordon McLean, Fuquay-Varina, NC (US); Daniel James Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 11/280,839

(22) Filed: Nov. 15, 2005

(65) Prior Publication Data

US 2007/0113240 A1 May 17, 2007

(51) Int. Cl.
*G06F 17/00* (2006.01)

(52) U.S. Cl. .............................. 235/375; 725/5; 725/8; 725/22; 725/88; 725/89; 725/102; 725/134; 725/142

(58) Field of Classification Search ................ 235/375; 725/5, 8, 22, 88, 89, 102, 134, 142
See application file for complete search history.

(56) References Cited

U.S. PATENT DOCUMENTS

2003/0031455 A1* 2/2003 Sagar .......................... 386/35
2005/0210498 A1* 9/2005 Scott et al. ...................... 725/8
2006/0143658 A1* 6/2006 Stone .......................... 725/58
2006/0282864 A1* 12/2006 Gupte .......................... 725/89
2008/0044154 A1* 2/2008 Quan et al. .................. 386/46

* cited by examiner

*Primary Examiner*—Michael G Lee
*Assistant Examiner*—Allyson N Trail
(74) *Attorney, Agent, or Firm*—Kunzler & McKenzie

(57) ABSTRACT

An apparatus, system, and method are disclosed for correlating a cost of receiving media to a user's exposure to advertising. A media display system including a media recorder detects and reports that a media display system user has skipped over an advertising program without watching or listening to the advertising program. A fee is calculated and charged to the user in lieu of the user's watching or listening to the advertising program. Alternatively, a user may subscribe to a service that allows the user to skip over some or all advertising programs displayed on the media display system.

13 Claims, 11 Drawing Sheets

150

| Channel 154 | Content 156 | Start 158 | End 160 | Rate 162 |
|---|---|---|---|---|
| 13 | Entertainment | 9 a.m. | 9:12 a.m. | None |
| 9 | Advertisement | 9:05 a.m. | 9:06 a.m. | High |
| 13 | Advertisement | 9:12 a.m. | 9:13 a.m. | Low |

Fig. 7

APPARATUS, SYSTEM, AND METHOD FOR CORRELATING A COST OF MEDIA SERVICE TO ADVERTISING EXPOSURE

BACKGROUND OF THE INVENTION

1. Field of the Invention

This invention relates to media display systems and more particularly relates to a system and method for correlating a cost of receiving media to a user's exposure to advertising.

2. Description of the Related Art

Media display systems often utilize media content providers which broadcast content to multiple users. For example, a television station may propagate a radio-frequency ("RF") signal that includes video and audio content of a television program. A radio station may propagate a similar RF signal that includes only audio content. Alternatively, a media content provider may simultaneously transmit a plurality of audio or television programs, usually utilizing a broadband delivery system such as a cable-television distribution network, a satellite-television distribution network, or a satellite-radio distribution network. Using a media reception device, such as a television or radio, a media display system user may select one of these plurality of transmitted programs to either listen to or watch.

Media recorders have become increasingly popular with media display system users. For example, many television viewers now utilize digital video recorders to store one or more television programs until a later and more convenient time to watch these programs. Similar devices for RF and Satellite radio programs are also available. With these media recorders, a media display system user may select, record, play, rewind, advance, or delete any of a multitude of programs broadcast by a media content provider. The advance function allows the user to skip over or fast-forward through segments of recorded programming; in particular many users utilize the advance function to skip over advertisements. Some media recorders include intelligent "commercial advance" features that attempt to differentiate advertisement content from program content and allow the user to manually or automatically skip advertising content. Media recorders also have the capacity to capture, store, and report information on the user's actions (such as which portions of a recorded program are skipped).

The schematic block diagram of FIG. 1 illustrates a traditional media display system 10 including a content provider 12, a media recorder 14, and a media display device 16. The content provider 12 may include a broadcaster, a cable-television provider, a satellite-television provider, a satellite-radio provider, or the like. The media recorder 14 may include a digital video recorder ("DVR"), a general purpose computing system, a digital audio recorder/playback device, or similar recording device. The media content provider 12 provides a multitude of media programs collectively indicated as media content 18. The media display device 16 may include a television, a radio, a computer monitor, or other device capable of displaying this media content 18 as displayed media 26. A user input device 28, such as an infra-red remote control or a general purpose computer pointing device, allows the media display system user to select a program from the media content 18 for display or storage.

A media transmission communication path 20 carries media content from the media content provider 12 to the media recorder 14. This media transmission communication path 20 may include an RF transmission/reception system, a cable-distribution system, a satellite-distribution system, or the like.

Some media display systems 10 include a data transmission communication path 30 from the media recorder 14 to the media content provider 12. The media content provider 12 may utilize this data transmission communication path 30 to collect information from the media recorder 14 such as the media recorder's identification, the location of the media recorder 14, or similar information. Alternatively, some media display systems 10 may utilize a bi-directional media transmission communication path 20 capable of carrying information from the media recorder 14 to the media content provider 12.

The media recorder 14 typically includes a media storage device 22 such as a hard disk drive, a tape cartridge, an optical-disk, a flash memory device, a non-volatile random access memory device, or the like. Media content 18 is stored on the media storage device 22 until requested by the media display system user. Once selected, the media content 18 is transmitted to the media display device 16 via a display transmission communication path 24.

The media content 18 provided by the media content provider 12 typically includes a large percentage of advertising programs. Advertisers pay media content providers 12 large amounts of money to broadcast these advertising programs to media display system users with the expectation that these users will watch or listen to the advertising programs. However, using media recorders 14, media display system users can advance the media recorder 14 through an advertising program, effectively skipping over the advertising program. This situation creates a problem in that advertisers will reduce the amount of money they are willing to pay to media content providers if the media content providers cannot ensure that the advertising programs will be watched or listened to by a sufficient number of media display system users. The media content providers, therefore, may wish to encourage media display system users to watch or listen to more advertising programs or the media content providers may be forced to seek other forms of revenue.

From the foregoing discussion, it should be apparent that a need exists for an apparatus, system, and method for correlating a cost of receiving media to a user's exposure to advertising. Beneficially, such an apparatus, system, and method would perform this task while utilizing a reporting function from the media recorder to the media content provider.

SUMMARY OF THE INVENTION

The present invention has been developed in response to the present state of the art, and in particular, in response to the problems and needs in the art that have not yet been fully solved by currently available media display systems. Accordingly, the present invention has been developed to provide an apparatus, system, and method for correlating a cost of receiving media to a user's exposure to advertising.

The apparatus to correlate a cost of receiving media to a user's exposure to advertising is provided with a plurality of modules configured to functionally execute the necessary steps of reporting viewing activities of a media display system user to a media content provider and to calculate a fee charged to the media display system user based on the reported viewing activities of the user. Conversely, the media content provider may calculate and apply a refund or a discount to current or future customer charges in exchange for viewing advertisements. Alternatively, the apparatus to correlate a cost of receiving media to a user's exposure to advertising may include modules to generate a table of allowable skip advertisement correlating to a user's subscription level and to allow the user to skip advertising programs based on the table of allowable skip advertisement.

The apparatus, in one embodiment, is configured to determine that a skip event has occurred.

The apparatus is further configured, in one embodiment, to compare the skip event to a schedule of programming.

A system of the present invention is also presented to create a skip schedule including a plurality of program events that may be skipped by a system user. The system may be embodied as a media display system. In particular, the system, in one embodiment, includes a media content provider, a digital media recorder; a media display, and a skip schedule creation module.

The system may further include a skip allowance module for either allowing or denying a user's skip request.

A method of the present invention is also presented for charging a user a fee to skip a media program event. The method in the disclosed embodiments substantially includes the steps necessary to carry out the functions presented above with respect to the operation of the described apparatus and system. In one embodiment, the method includes detecting a skip request and calculating a fee based on the skip request. The method also may include comparing the skip request to a schedule of programming prior to calculating the fee.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7 is a block diagram of one embodiment of a schedule of programming table in accordance with the present invention;

DETAILED DESCRIPTION OF THE INVENTION

Figure 1:
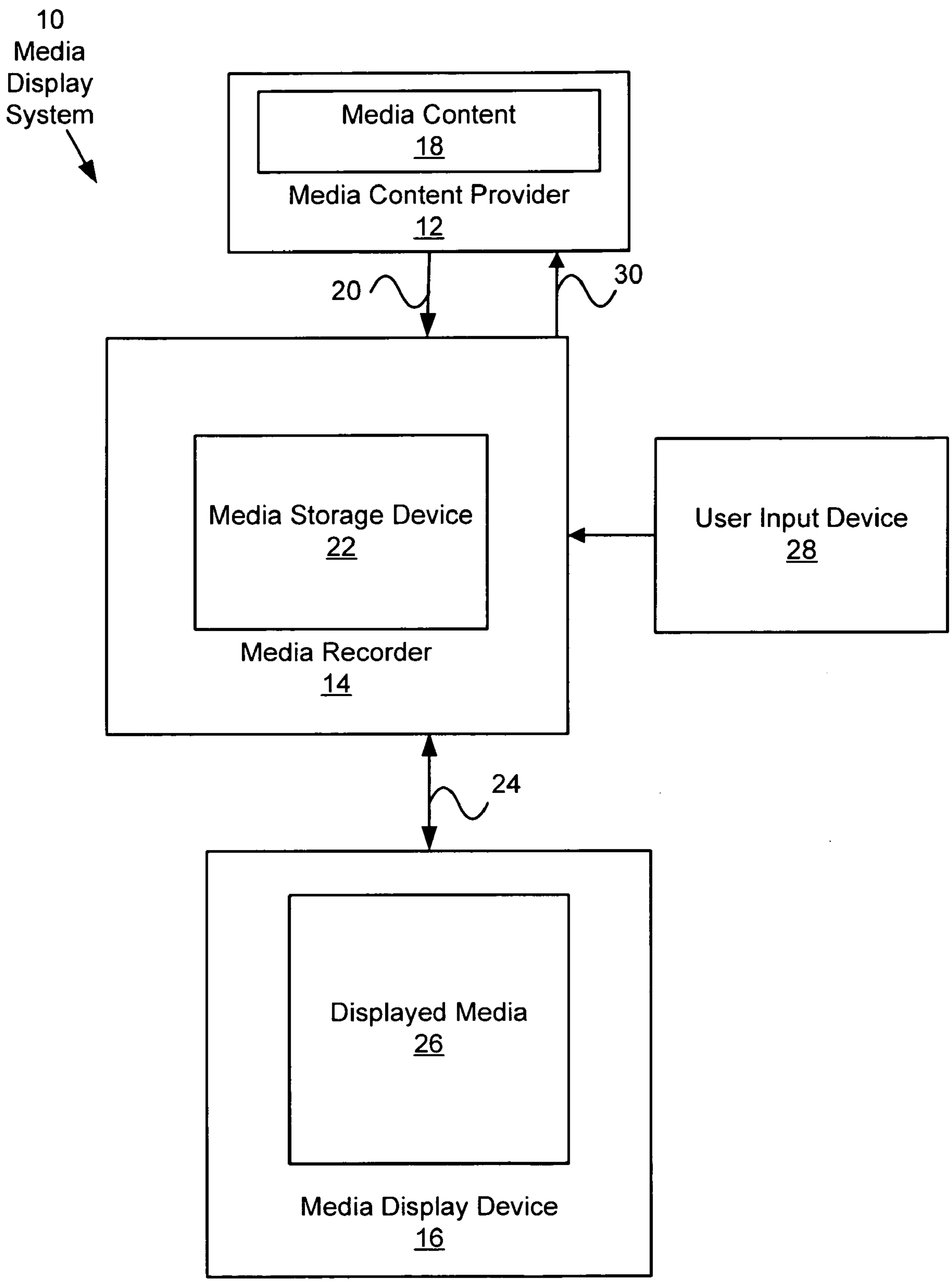
Fig. 1 (Prior Art)
FIG. 1 is a schematic block diagram illustrating a media display system in accordance with the current state of the art.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The invention disclosed herein may be implemented as a method, apparatus, or signal bearing medium using standard programming or engineering techniques to produce software, firmware, hardware, or any combination thereof. A signal bearing medium may take any form capable of generating a signal, causing a signal to be generated, or causing execution of a program of machine-readable instructions on a digital processing apparatus. A signal bearing medium may be embodied by a transmission line, a compact disk, a digital-video disk, a magnetic tape, a Bernoulli drive, a magnetic disk, a punch card, a flash memory, an integrated circuit, an optical storage device, a floppy disk, an electrically-erasable programmable read-only memory ("EEPROM"), a volatile memory device, a non-volatile memory device, a field programmable gate array ("FPGA"), an application-specific integrated circuit ("ASIC"), a complex programmable logic device ("CPLD"), a programmable logic array ("PLA"), a microprocessor ("uP"), a programmable logic device ("PLD"), or other digital processing device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
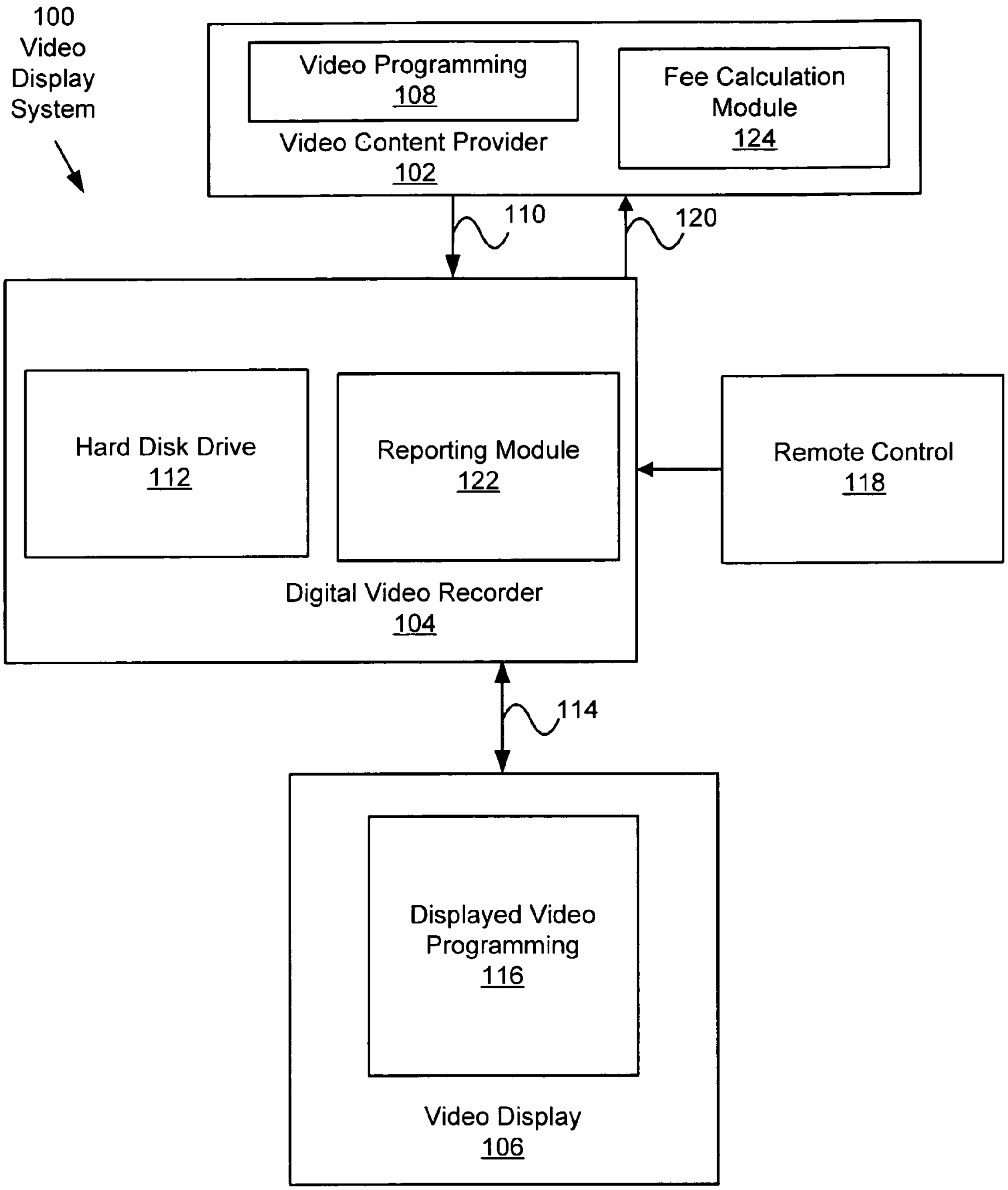
FIG. 2 is a schematic block diagram illustrating one embodiment of a media display system in accordance with the present invention.

FIG. 2 depicts a schematic block diagram of a digital video recorder ("DVR") video display system 100, according to the invention, including a video content provider 102, a digital video recorder 104, and a video display 106. While the invention is illustrated herein as it applies to DVR video display systems, the invention applies to any type and kind of media display system.

The video content provider 102, a type of media content provider, may be any of a multitude of television broadcast stations, cable-television distribution companies, or satellite-television distribution companies. The video display 106, a type of media display, may include a television, computer display, or the like. The video content provider 102 provides media content that, in this exemplary embodiment of the invention, includes video programming 108, i.e., a collection of entertainment and advertising programs intended for display on a television or like device. A video transmission communication path 110, a type of media transmission communication path, may include a satellite-television distribution system, a cable-television distribution system, an RF-broadcast television distribution system, or the like.

A hard disk drive 112, a type of media storage device, stores video programming 108 that has been transmitted by the video content provider 102 to the digital video recorder 104. A digital/audio cable 114, a type of display transmission communication path, allows video programming 108 to be transmitted from the digital video recorder 104 to the video display 106. Once the video programming 108 arrives at the video display 106, it is presented to the video display system user as displayed video programming 116. A remote control 118, such as an infra-red ("IR") or RF frequency wireless remote, serves as a user input device, allowing the user to select, record, play, rewind, and advance entertainment and advertising programs from the video programming 108. A telephone communication system 120, an exemplary data transmission communication path, is utilized by the video content provider 102 to collect information from the digital video recorder 104 such as the DVR's identification, the location of the DVR 104, the viewing activities of the user, or other similar information. In this embodiment of the invention, a reporting module 122 accumulates information regarding the viewing habits of the user and transmits this information to the video content provider 102. A fee calculation module 124 receives user activity information from the reporting module 122 and determines an appropriate fee to be charged to the user based on the received user activity. The fee calculation module 124 is illustrated herein as residing within the video content provider 102. However, the placement of the fee calculation module 124 in this illustration is not limiting on the scope of the invention, as the fee calculation module 124 may reside within the digital video recorder 104 or separate from both the video content provider 102 and the digital video recorder 104.

In this embodiment of the invention, every instance of a user skipping over an advertising program is reported by the reporting module 122 to the fee calculation module 124. The fee calculation module 124 may generate a billing to the user based on a flat fee per skip instance times the number of instances. Alternatively, advertisement programs may carry disparate values for being skipped, resulting in a weighted fee calculation. In an alternate embodiment of the invention, the fee calculation module simply collects the information regarding the advertising program skipping activity of video display system users. This information may be provided to advertisers and other interested parties. This information may be utilized by the advertisers to calculate a credit for advertising that has been skipped by a user or to calculate a refund to be remitted to the advertisers. In yet another embodiment of the invention, the fee calculation module may calculate a rebate, refund, or credit due to the user based on the number of advertisement programs that were not skipped.

Figure 3:
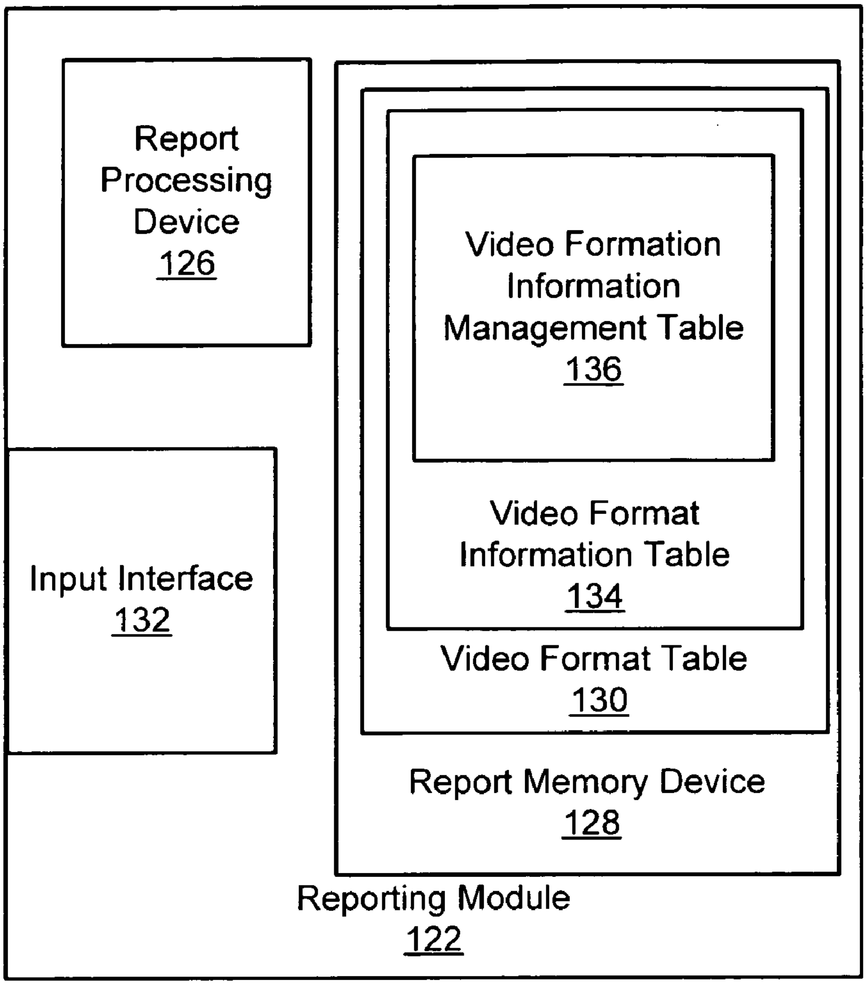
FIG. 3 is a schematic block diagram illustrating one embodiment of a reporting module in accordance with the present invention.

The schematic block diagram of FIG. 3 illustrates the reporting module 122 of FIG. 2, including a report processing device 126 and a report memory device 128 including a video format table 130 and an input interface 132 for receiving input from the remote control 118. The report processing device 126 may include any digital processing device such as a FPGA, an ASIC, a micro-processor, a general purpose computing device, a programmable logic device, or the like. The report memory device 128 may include any digital information storage device such as a random access memory ("RAM"), a hard disk drive, a floppy disk, or other type of signal bearing medium.

Figure 4:
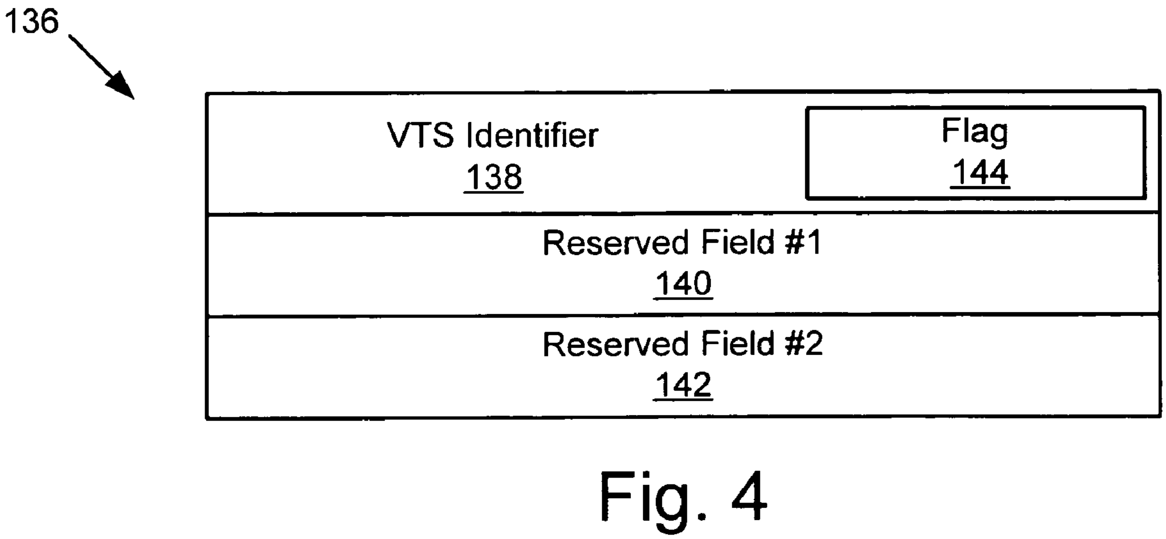
FIG. 4 is block diagram of one embodiment of a video format information management table in accordance with the present invention.

The video format table 130 includes information regarding the video programming 108 provided by the video content provider. In this illustrative embodiment of the invention, the video format table 130 conforms to the digital video disk ("DVD") specifications for read-only discs, part 3, video specification, version 1.0, published in August 1996, pp. V14, 38, and 39. In this embodiment of the invention, the video format table 130 includes a video format information table 134, in accordance with the video specification referred to above. Likewise, the video format information table 134 includes a video format information management table 136 in accordance with the same video specification The block diagram of FIG. 4 illustrates the video formation information management table 136 of FIG. 3, including a VTS identifier field 138, a first reserved field 140, and a second reserved field 142. In this embodiment of the invention, an advertising program indicator 144, such as a flag, is included in the VTS identifier field 138. However, in alternate embodiments of the invention, the advertising program indicator 144 may be included in the first reserved field 140, the second reserved field 142, or some other appropriate field of the video formation information management table 136.

Figure 5:
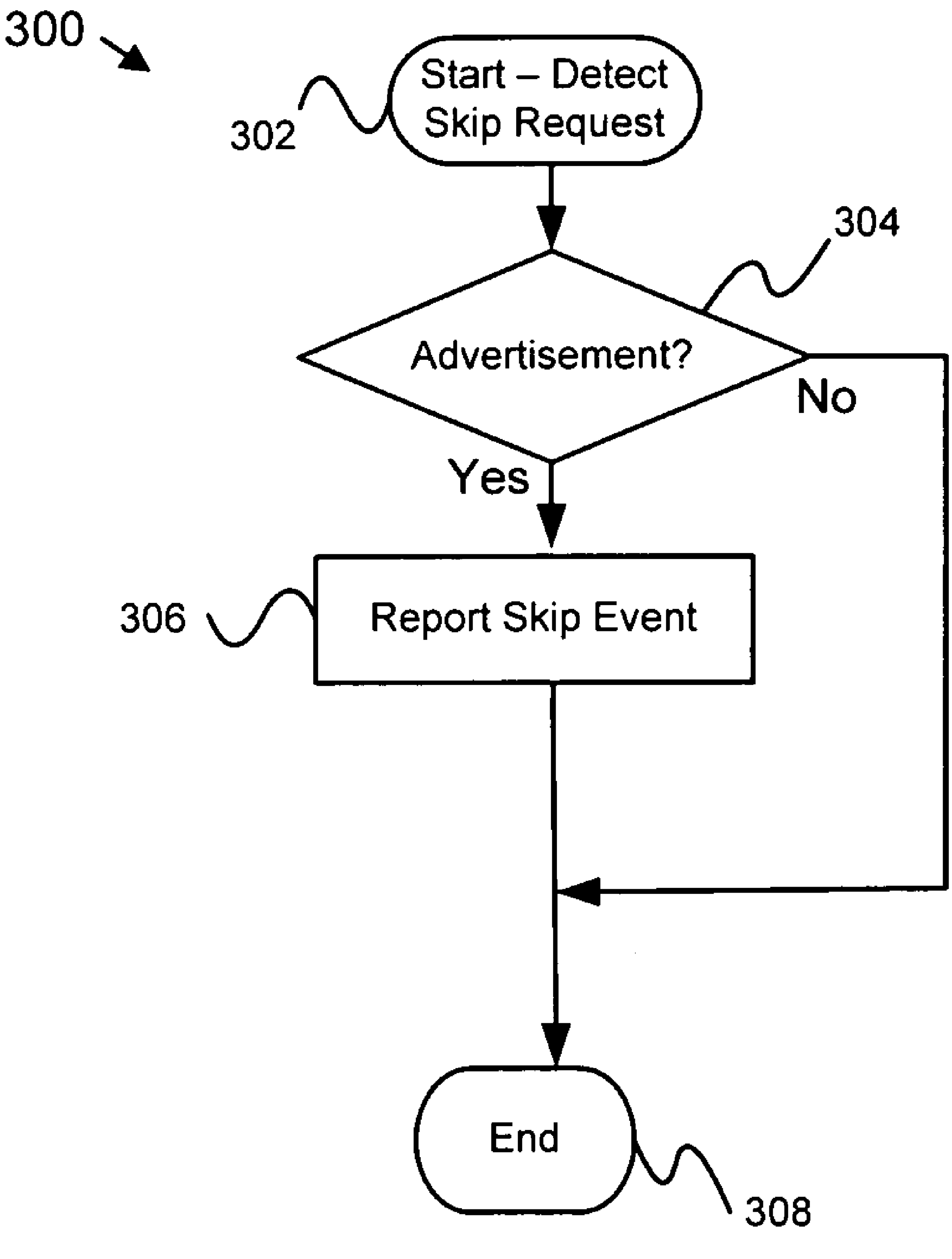
FIG. 5 is a schematic flow chart diagram illustrating one embodiment of a reporting method in accordance with the present invention.

The operation of the reporting module 122 is illustrated by the reporting method schematic flow chart 300 of FIG. 5. Operation of the reporting module 122 begins 302 when the report processing device 126 detects a user request to skip a video program via the input interface 132. The report processing device 126 examines 304 the video format information management table 136 to determine if the current video program is an advertisement, as indicated by the advertising program indicator 144. If so, the report processing device 126 reports 306 the skip event to the fee calculation module 124 and ends 308.

Figure 6:
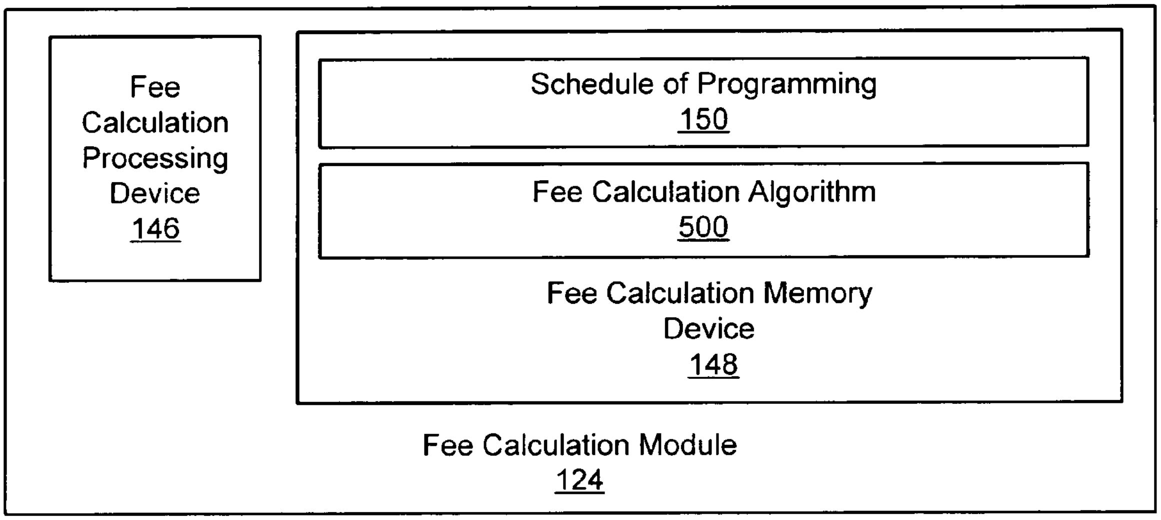
FIG. 6 is a schematic block diagram illustrating one embodiment of a fee calculation module in accordance with the present invention.

The schematic block diagram of FIG. 6 illustrates the fee calculation module 124 of FIG. 2, including a fee calculation processing device 146 and a fee calculation memory device 148 which, in turn, includes a schedule of programming 150 and a fee calculation algorithm 500. The fee calculation processing device 146 may include any digital processing device such as a FPGA, an ASIC, a micro-processor, a general purpose computing device, a programmable logic device, or the like. The fee calculation memory device 148 may include any digital information storage device such as a random access memory ("RAM"), a hard disk drive, a floppy disk, or other type of signal bearing medium.

An exemplary schedule of programming 150 is illustrated by the table of FIG. 7, including channel indicator fields 154, video content fields 156, start-time fields 158, end-time fields 160, and rate fields 162. The channel indicator fields 154 simply index the schedule of programming 150 according to video streams separated into channels. The video content fields 156 indicate whether a particular program is an entertainment program or an advertisement program. The start-time fields 158 and the end-time fields 160 indicate the time each program begins and ends, respectively. The optional rate fields 162 indicate whether skipping a particular program should result in the user being charged a relatively high fee, a moderate fee, a low fee, or no fee.

Figure 8:
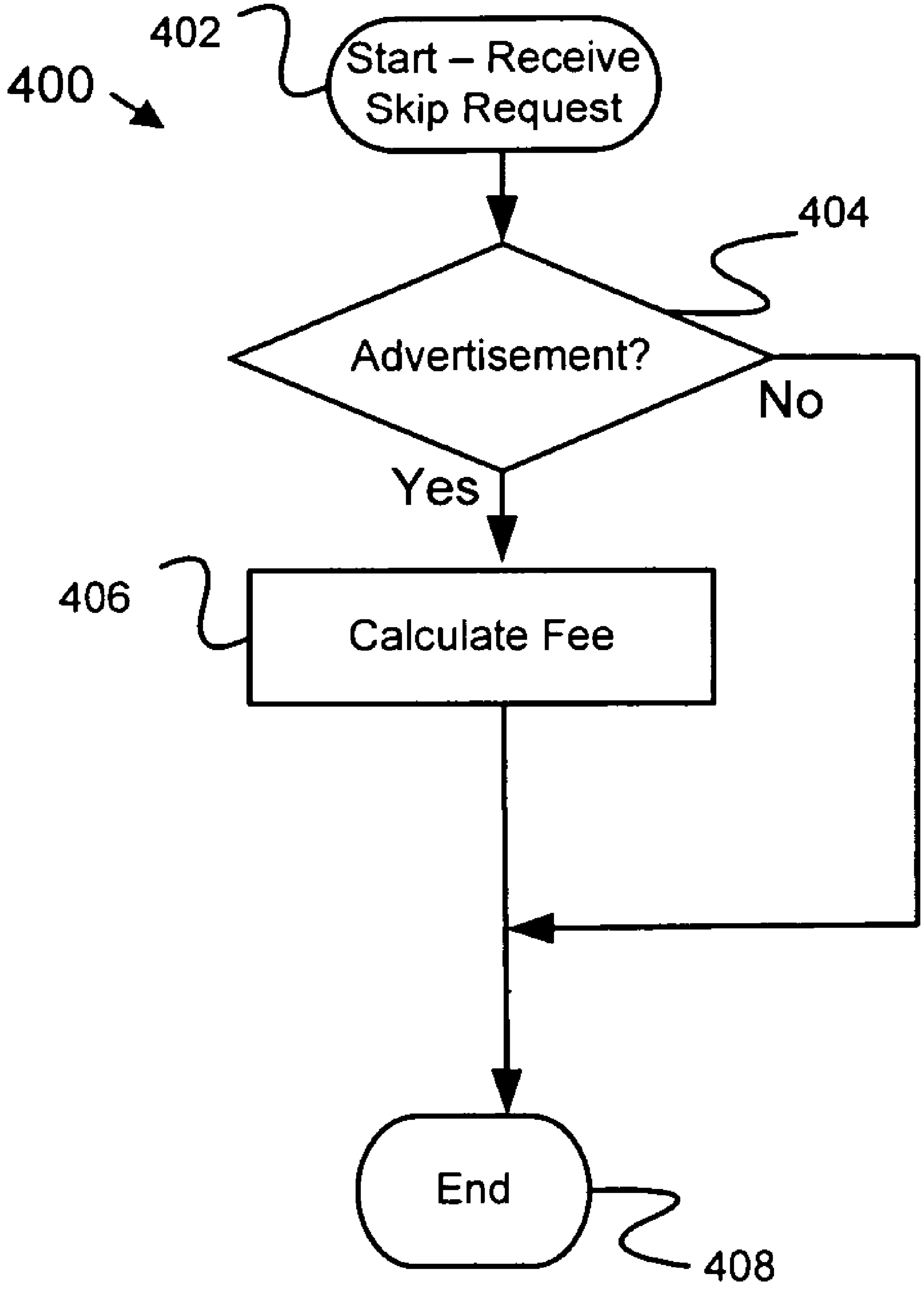
FIG. 8 is a schematic flow chart diagram illustrating one embodiment of a fee calculation method in accordance with the present invention.

The operation of the fee calculation module 124 is illustrated by the fee calculation schematic flow chart 400 of FIG. 8. Operation of the fee calculation module 124 begins 402 when the fee calculation module 124 receives a report of a skip event from the reporting module 122. The fee calculation processing device 148 examines 404 the schedule of programming to determine if the skipped event was an advertising program. If so, a fee to be billed to the user is calculated 406 by the fee calculation processing device 148 and the operation ends 408. If a flat fee is charged for each advertisement that is skipped, the calculated fee is simply the number of skipped events times the fee for each skipped event. However, in one embodiment of the invention, the fee charged for each skipped advertisement may be one of a multitude of disparate values, as illustrated by the rate fields 162 of the schedule of programming 150. In yet another embodiment of the invention, the reporting module 122 may report to the fee calculation module 124 only advertisement programs that are watched by the user. Or, the reporting module 122 may report to the fee calculation module 124 a combination of advertisement programs that are watched and advertisement programs that are skipped. In both of these embodiments, the fee calculation module may credit the user for each advertisement program that was watched by the user.

Figure 9:
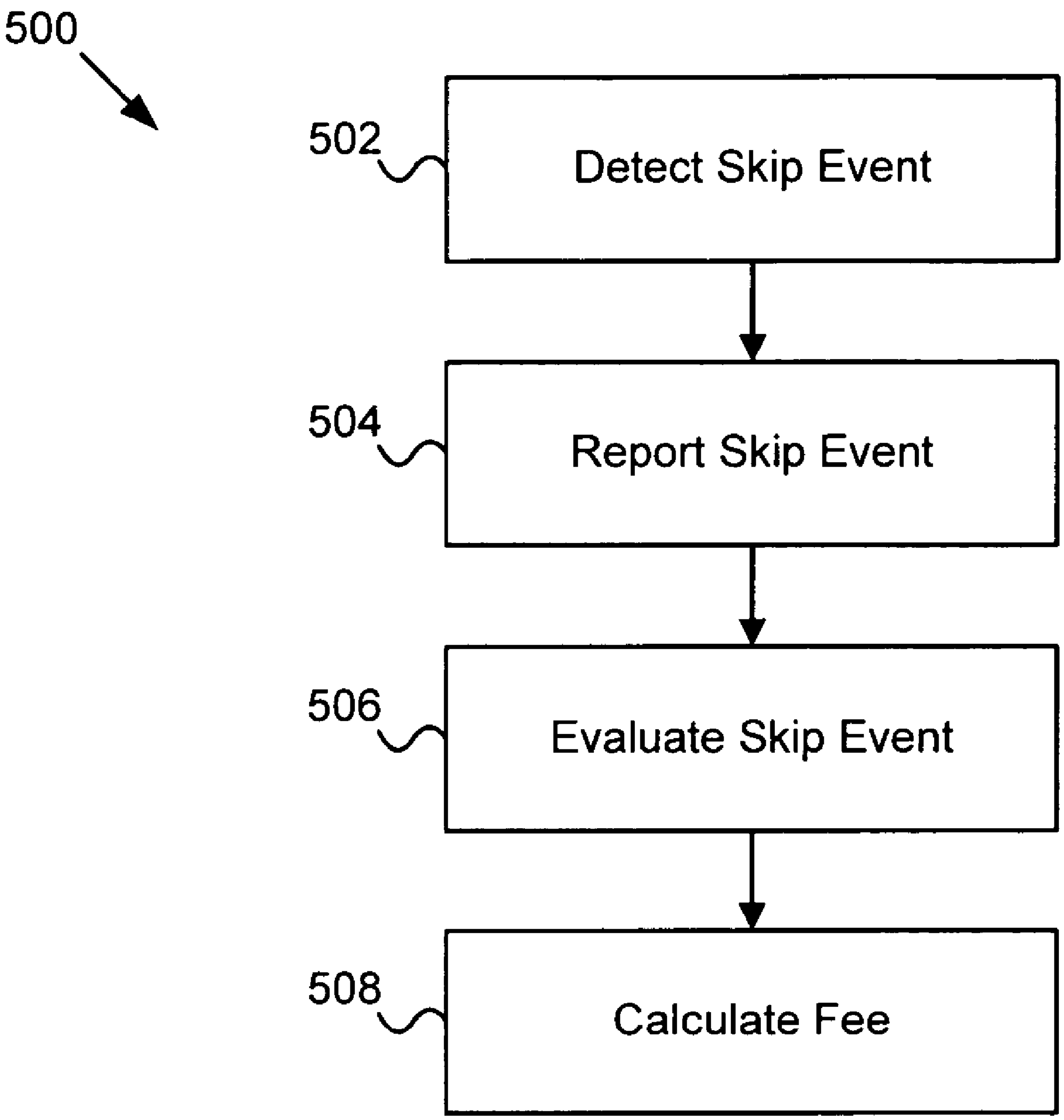
FIG. 9 is a block diagram illustrating one embodiment of a fee calculation algorithm in accordance with the present invention.

The fee calculation algorithm 500 is illustrated by the block diagram of FIG. 9. While the fee calculation algorithm 500 is illustrated as residing in the fee calculation memory device 148, it may actually exist as sub-components distributed among the fee calculation module 124 and the reporting module 122. Here, a skip event is detected 502 by the report processing device 126 of the reporting module 122. The skip event is reported 504 to the fee calculation module 124 where it is evaluated 506 against the schedule of programming 150 and a fee is calculated 508 by the fee calculation processing device 146.

Figure 10:
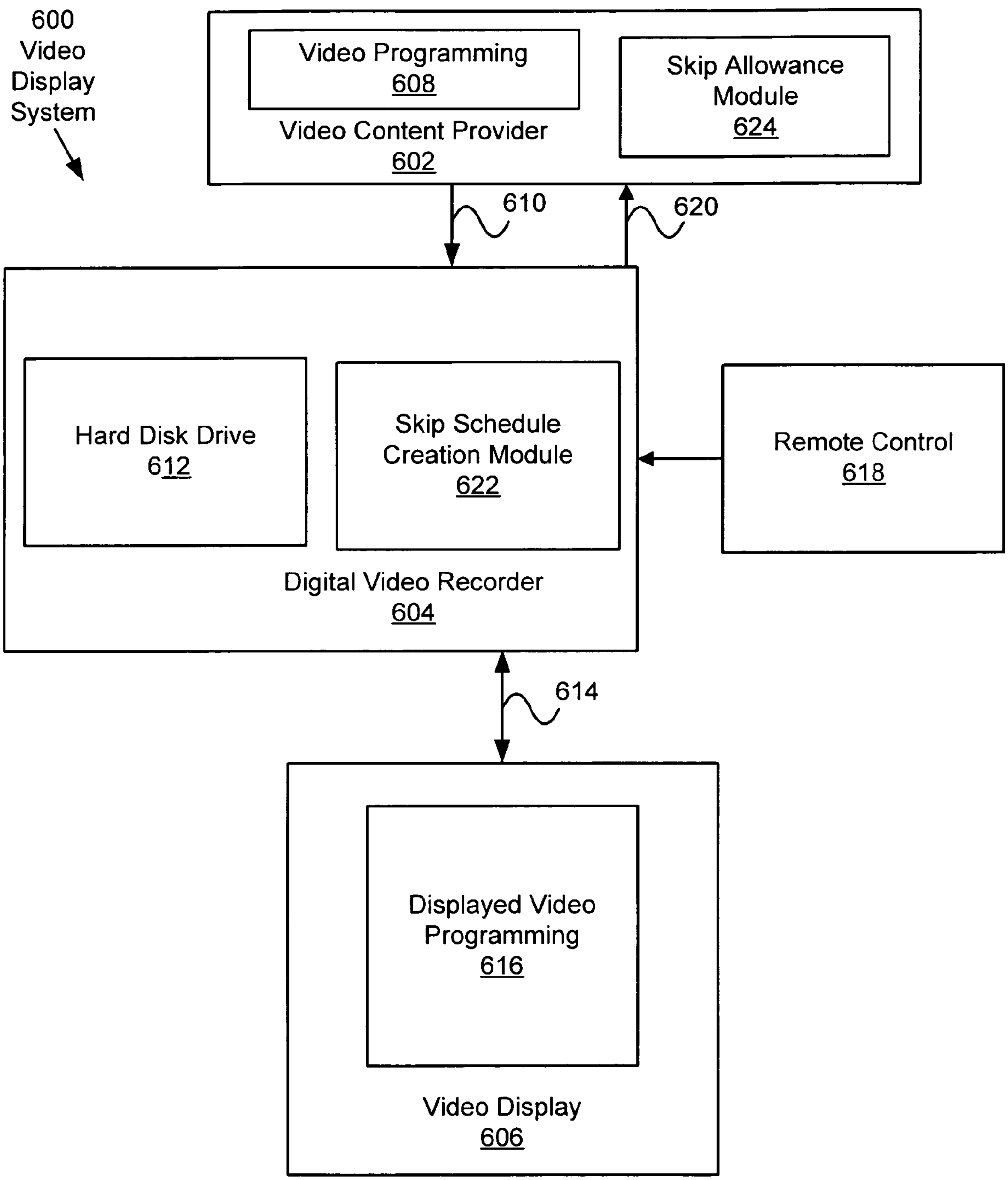
FIG. 10 is a schematic block diagram illustrating another embodiment of a media display system in accordance with the present invention.

FIG. 10 depicts a schematic block diagram of yet another embodiment of a digital video recorder ("DVR") video display system 600, similar to that of FIG. 2, including a video content provider 602, a digital video recorder 604, and a video display 606 wherein the fee calculation module 124 and the reporting module 122 of FIG. 2 have been replaced with a skip schedule creation module 622 and a skip allowance module 624, respectively.

The video content provider 602, a type of media content provider, may be any of a multitude of television broadcast stations, cable-television distribution companies, or satellite-television distribution companies. The video display 606, a type of media display, may include a television, computer display, or the like. The video content provider 602 provides media content that, in this exemplary embodiment of the invention, includes video programming 608, i.e., a collection of entertainment and advertising programs intended for display on a television or like device. A video transmission communication path 610, a type of media transmission communication path, may include a satellite-television distribution system, a cable-television distribution system, an RF-broadcast television distribution system, or the like.

A hard disk drive 612, a type of media storage device, stores video programming 608 that has been transmitted by the video content provider 602 to the digital video recorder 604. A digital/audio cable 614, a type of display transmission communication path, allows video programming 608 to be transmitted from the digital video recorder 604 to the video display 606. Once the video programming 608 arrives at the video display 606, it is presented to the video display system user as displayed video programming 616. A remote control 618, such as an infra-red ("IR") or RF frequency wireless remote, serves as a user input device, allowing the user to select, record, play, rewind, and advance entertainment and advertising programs from the video programming 608. A telephone communication system 620, an exemplary data transmission communication path, is utilized by the video content provider 602 to collect information from the digital video recorder 604 such as the DVR's identification, the location of the DVR 604, the viewing activities of the user, or other similar information. In this embodiment of the invention, a skip schedule creation module 622 creates a skip schedule utilized by the skip allowance module 624 to determine whether a user may skip an advertisement program or not. The skip schedule creation module 622 is illustrated herein as residing within the video content provider 602. However, the placement of the skip schedule creation module 622 in this illustration is not limiting on the scope of the invention, as the skip creation module 622 may reside within the digital video recorder 604 or separate from both the video content provider 602 and the digital video recorder 604.

Figure 11:
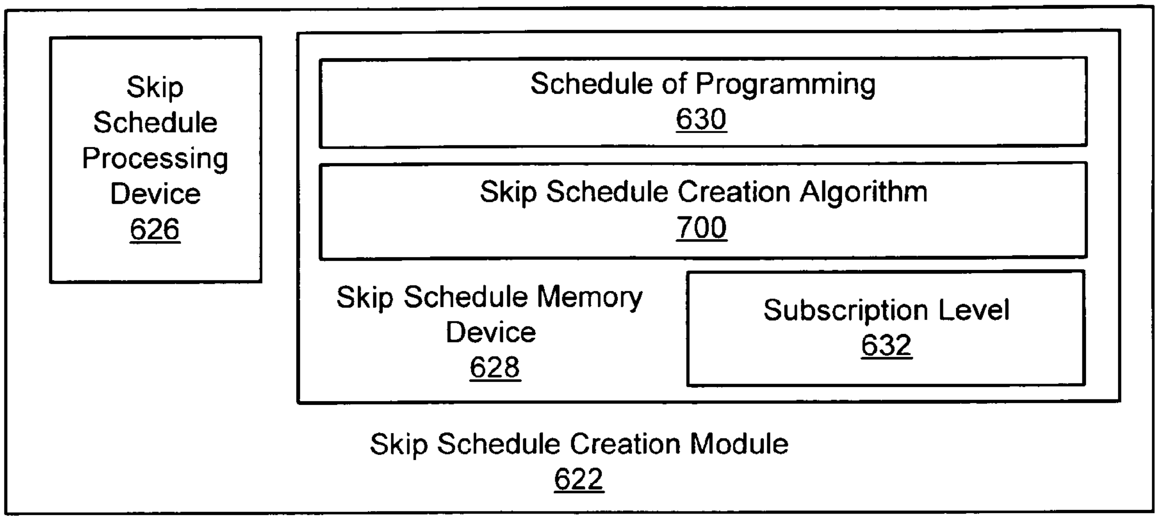
FIG. 11 is a schematic block diagram illustrating one embodiment of the skip schedule creation module in accordance with the present invention.

The schematic block diagram of FIG. 11 illustrates the skip schedule creation module 622 of FIG. 10, including a skip schedule processing device 626 and a skip schedule memory device 628 including a schedule of programming 630, a user's subscription level 632, and a skip schedule creation algorithm 700. The skip schedule processing device 626 may include any digital processing device such as a FPGA, an ASIC, a micro-processor, a general purpose computing device, a programmable logic device, or the like. The skip schedule memory device 628 may include any digital information storage device such as a random access memory ("RAM"), a hard disk drive, a floppy disk, or other type of signal bearing medium.

Figure 12:
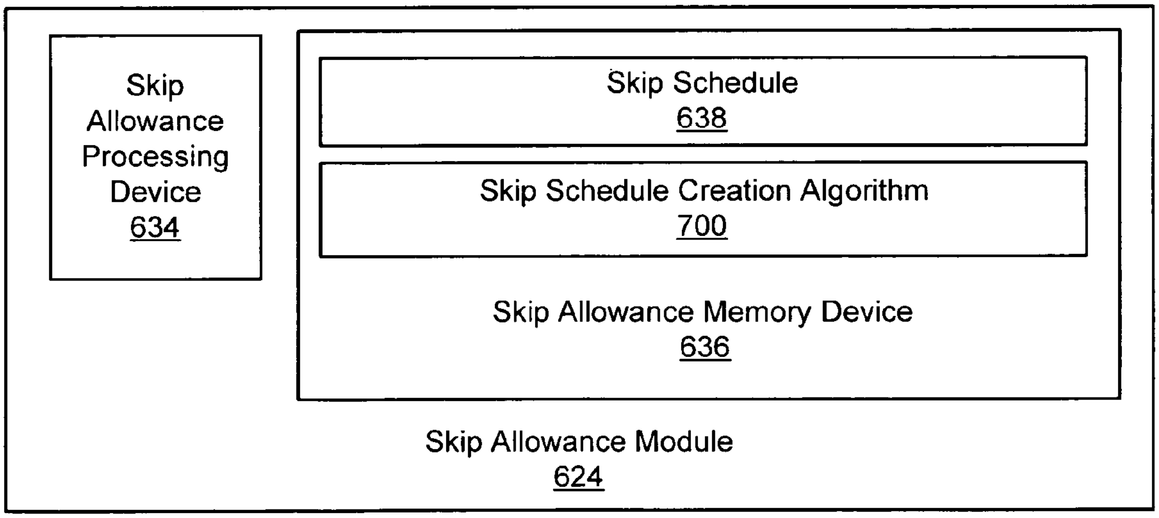
FIG. 12 is a schematic block diagram illustrating one embodiment of the skip allowance module in accordance with the present invention.

The schematic block diagram of FIG. 12 illustrates the skip allowance module 624 of FIG. 10, including a skip allowance processing device 634 and a skip allowance memory device 636 which, in turn, includes a skip schedule 650 and a skip schedule creation algorithm 700. The skip allowance processing device 634 may include any digital processing device such as a FPGA, an ASIC, a micro-processor, a general purpose computing device, a programmable logic device, or the like. The skip allowance memory device 636 may include any digital information storage device such as a random access memory ("RAM"), a hard disk drive, a floppy disk, or other type of signal bearing medium.

Figure 13:
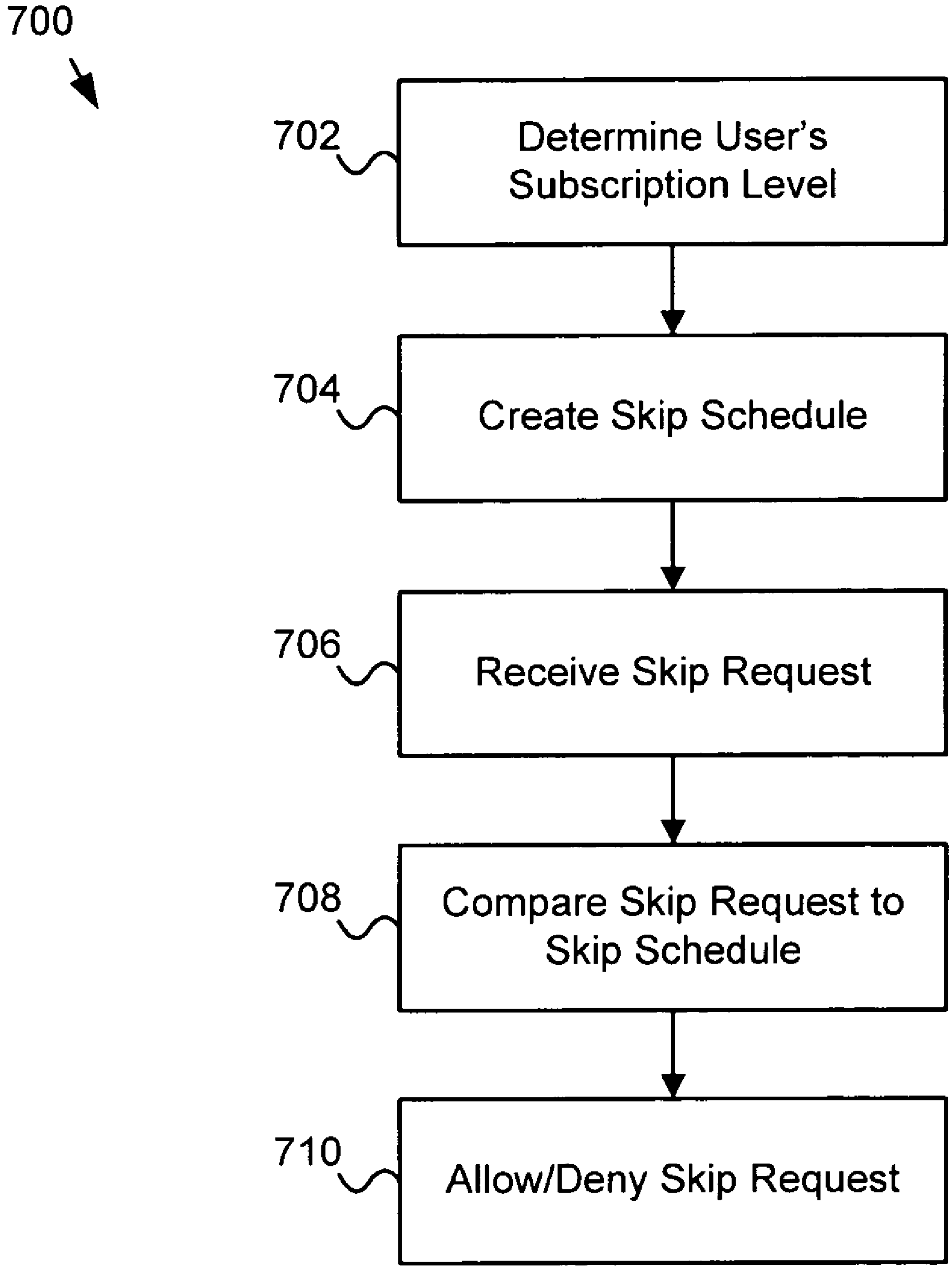
FIG. 13 is a block diagram illustrating one embodiment of a skip schedule creation algorithm in accordance with the present invention.

The operation of this embodiment of the invention is illustrated by the skip schedule creation algorithm 700 of the block diagram of FIG. 13. The skip schedule creation algorithm 700 may reside in either the skip schedule memory device 628, the skip allowance memory device 636, or as sub-components in both. Here, a user's subscription level is determined 702 by the skip schedule processing device 626. Using this information, the skip schedule processing device 626 adds skip fields to the schedule of programming 630, creating 704 a skip schedule which is transmitted to the skip allowance module 624. When a user requests to skip a program, a skip request is transmitted to the skip allowance processing device 634 via the remote control 638. Once the skip request is received 706 by the skip allowance processing device 634, the skip allowance processing device 634 evaluates 708 the skip schedule to determine if the user has a sufficient subscription level to skip the correlating advertisement program. If so, the skip allowance processing device 634 allows the skip request and the user may advance through the advertisement program. If not, the skip request is denied.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to display media, the apparatus comprising:

a media content provider;

a digital media recorder in communication with the media content provider;

a media display in communication with the digital media recorder;

a reporting module in communication with the media content provider for determining that a skip event has occurred, wherein the skip event correlates to an advertisement program, and reporting the skipped event back to the media content provider; and a fee calculation module in communication with the media content provider for comparing the skip event to a schedule of programming to determine whether a fee should be charged to a media display system user after the media presentation.

2. The apparatus of claim 1, wherein the reporting module is further configured to report the skip event to the fee calculation module.

3. The apparatus of claim 1, wherein the fee calculation module is further configured to calculate the fee to be charged to the media display system user based on the skip event reported by the reporting module.

4. The apparatus of claim 3, wherein the fee calculation module is further configured to calculate the fee to be charged to the media display system user based on a rate field of the schedule of programming.

5. The apparatus of claim 1, wherein the media content provider includes a television-distribution company.

6. The apparatus of claim 1, wherein the digital media recorder includes a digital video recorder.

7. The apparatus of claim 1, further comprising a fee calculation module in communication with the media content provider for comparing the skip event to a schedule of programming to determine whether a refund should be provided to an advertiser.

8. A system to display media, the system comprising:

a media content provider;

a digital media recorder;

a media transmission communication path to connect the media content provider to the digital media recorder;

a media display;

a display transmission communication path to connect the digital media recorder to the media display;

a skip schedule creation module in communication with the media content provider for creating a skip schedule including a plurality of program events including advertising programs that may be skipped by a system user;

a skip allowance module configured to skip a program event and report the skip event to the media content provider if the skip event correlates to an advertisement program; and a fee calculation module in communication with the media content provider for comparing the skip event to a schedule of programming to determine whether a fee should be charged to a media display system user after the media presentation.

9. The system of claim 8, wherein the skip schedule creation module is adapted to utilize the system user's subscription level to determine which of the plurality of program events may be skipped by the system user.

10. The system of claim 8, wherein the skip allowance module is adapted to compare a skip request to the skip schedule before allowing the system user to skip a program event.

11. A method for charging a user a fee to skip a media program event, the method comprising:

detecting a skip event wherein the skip event correlates to an advertisement program;

reporting the skipped event back to a media content provider;

comparing the skip event to a schedule of programming to determine a fee rate; and calculating a fee based on the skip request to be charged to the media display system user after the media presentation.

12. The method of claim 11, wherein the method further comprises detecting that an advertisement program has been watched by a system user.

13. The method of claim 12, wherein the method further comprises calculating a credit based on detecting that the advertisement program has been watched by the system user.

* * * * *